Figure 1:
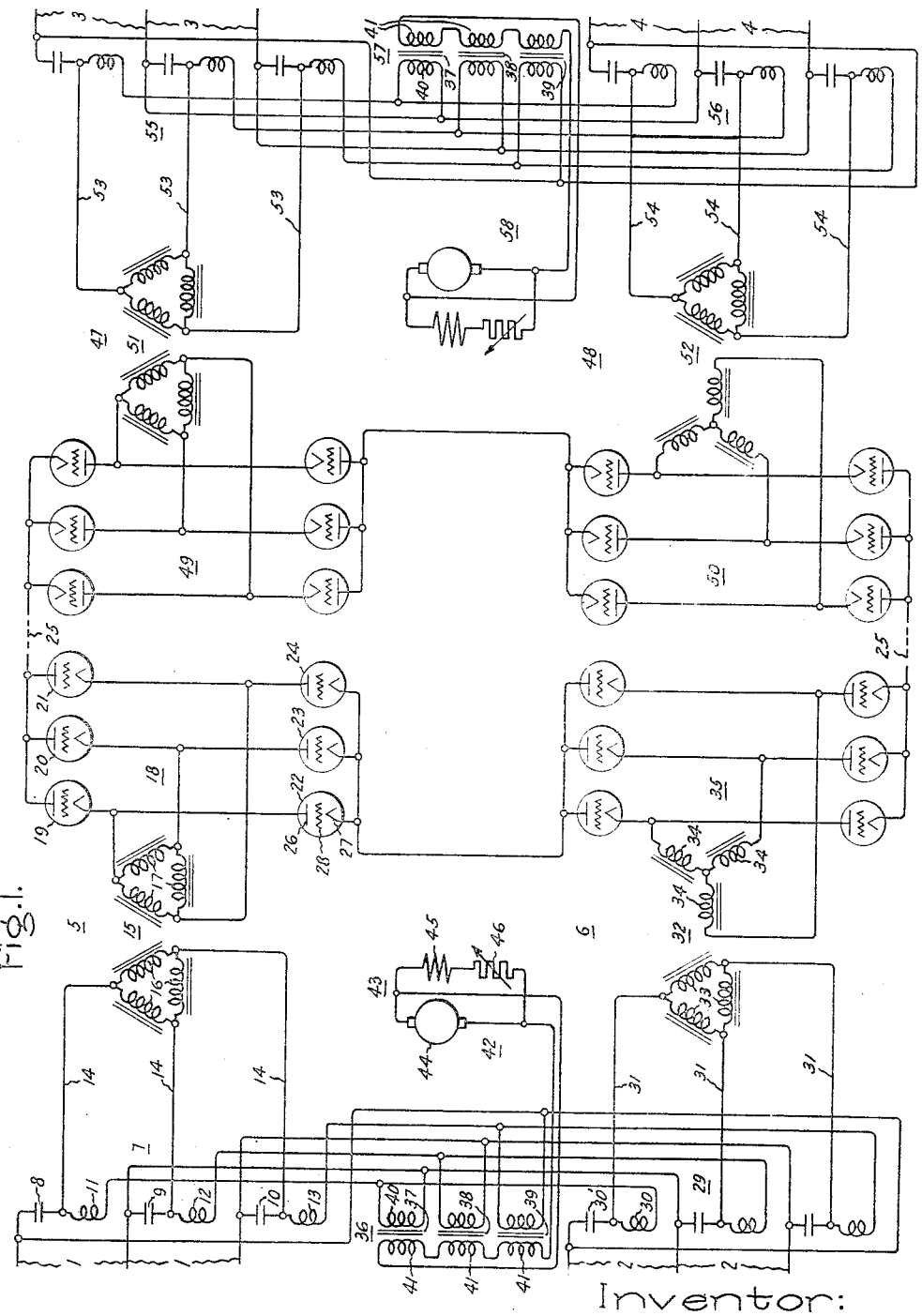

Patented July 26, 1938

2,125,097

UNITED STATES PATENT OFFICE 2,125,097

ELECTRIC POWER SYSTEM

Burnice D. Bedford, Schenectady, N. Y., assignor to General Electric Company, a corporation of New York Application October 9, 1937, Serial No. 168,221

20 Claims. (Cl. 171—97)

My invention relates to electric power systems and more particularly to electric power transmission systems of the type disclosed and claimed in United States Letters Patent No. 1,990,758, granted February 12, 1935, on an application of Charles W. Stone and assigned to the assignee of the present invention.

Briefly described, the system as disclosed in the Stone patent comprises a source of power of constant voltage alternating current which is transformed to alternating current of constant value and then rectified by an alternating current rectifier for transmission at high voltage direct current. The constant direct current is transmitted over a transmission circuit to a receiving circuit, which includes an electric valve inverter for changing the transmitted power to alternating current of constant value which is transformed to alternating current of constant voltage for distribution purposes or for connection with another constant voltage alternating current system. The electric valve converting circuits employ networks of the monocyclic type for transforming alternating current from constant voltage to constant current, or vice versa. These networks comprise reactances of opposite sign such as inductive reactances and capacitive reactances.

My invention relates to an improvement of the electric power transmission system disclosed in my joint copending patent application Serial No. 97,012, filed August 20, 1936, and which is assigned to the assignee of the present application. In electric power transmission systems of this type, as explained in the copending application, it has been found desirable to employ a plurality of electric circuits which are interposed between a single constant voltage alternating current circuit or a plurality of constant voltage alternating current circuits and the high voltage direct current circuit to effect the most satisfactory operation of systems of this nature. When a plurality of electric circuits are so used, it has become evident that there is a decided need for arrangements to control the division of load among the various electric circuits, and furthermore it has become evident that there is a need for apparatus which not only controls the division of load among the various circuits but also controls the current transmitted to or received from the various monocyclic networks employed in the system.

It is an object of my invention to provide a new and improved electric power transmission system.

It is another object of my invention to provide a new and improved control and regulating arrangement in an electric system of the constant voltage, constant current type comprising a plurality of constant voltage circuits and a plurality of constant current circuits for maintaining a predetermined division of load among the various electric circuits and for controlling the values of current in the various constant current circuits.

It is a further object of my invention to provide a new and improved electric valve system of the type described and claimed in the above mentioned Stone patent and in my copending joint application Serial No. 97,012.

It is a still further object of my invention to provide a new and improved electric valve power transmission system of the type in which energy is transmitted in the form of high voltage, constant current, direct current and in which there are provided arrangements for controlling the division of load among the several electric circuits associated with the system.

In accordance with one feature of the illustrated embodiments of my invention, I provide a new and improved control or regulating system for controlling the division of load among a plurality of constant voltage-constant current circuits. Suitable transforming means, such as monocyclic networks, are interconnected between the constant voltage circuits and the constant current circuits to effect the desired transformation constant voltage to constant current, or vice versa, and suitable arrangements are interconnected between the various pairs of constant voltage-constant current circuits to maintain a predetermined division of load among the various circuits and to control the values of the currents maintained in these circuits.

In accordance with another feature of the illustrated embodiments of my invention, I provide a new and improved electric valve power transmission system of the type in which energy is transmitted in the form of high voltage direct current of constant value and in which power may be transmitted between constant voltage alternating current systems. The apparatus associated with the constant voltage systems comprises a plurality of electric circuits for transmitting power between the constant voltage alternating current circuits and the direct current circuit and each includes a suitable transforming means such as a monocyclic network comprising a plurality of branches of serially connected reactances of opposite sign, such as inductances and capacitances, which transform constant voltage alternating current to alternating current of constant value, or vice versa. Each of the electric circuits includes a constant current, alternating current circuit which is connected to the monocyclic network and an electric valve means which is connected between the constant current alternating current circuit and the constant current direct current circuit. To provide an arrangement for maintaining a predetermined division of load among the various electric circuits, I employ an inductive network comprising a plurality of inductive devices which are associated with corresponding elements of the monocyclic networks and which maintain a predetermined division of current among the respective constant current alternating current circuits. The networks of the inductive devices may be connected in series relation with corresponding elements of the monocyclic networks. Control windings are also associated with the inductive devices to control the impedances of the devices and hence to control the magnitudes of the currents which are maintained in the constant current alternating current circuits by the various monocyclic networks. In accordance with another embodiment of my invention, suitable controlling means such as switching apparatus and associated impedance elements are provided to shunt the inductive devices in the event it is desired to control the load division controlling apparatus.

Figure 2:
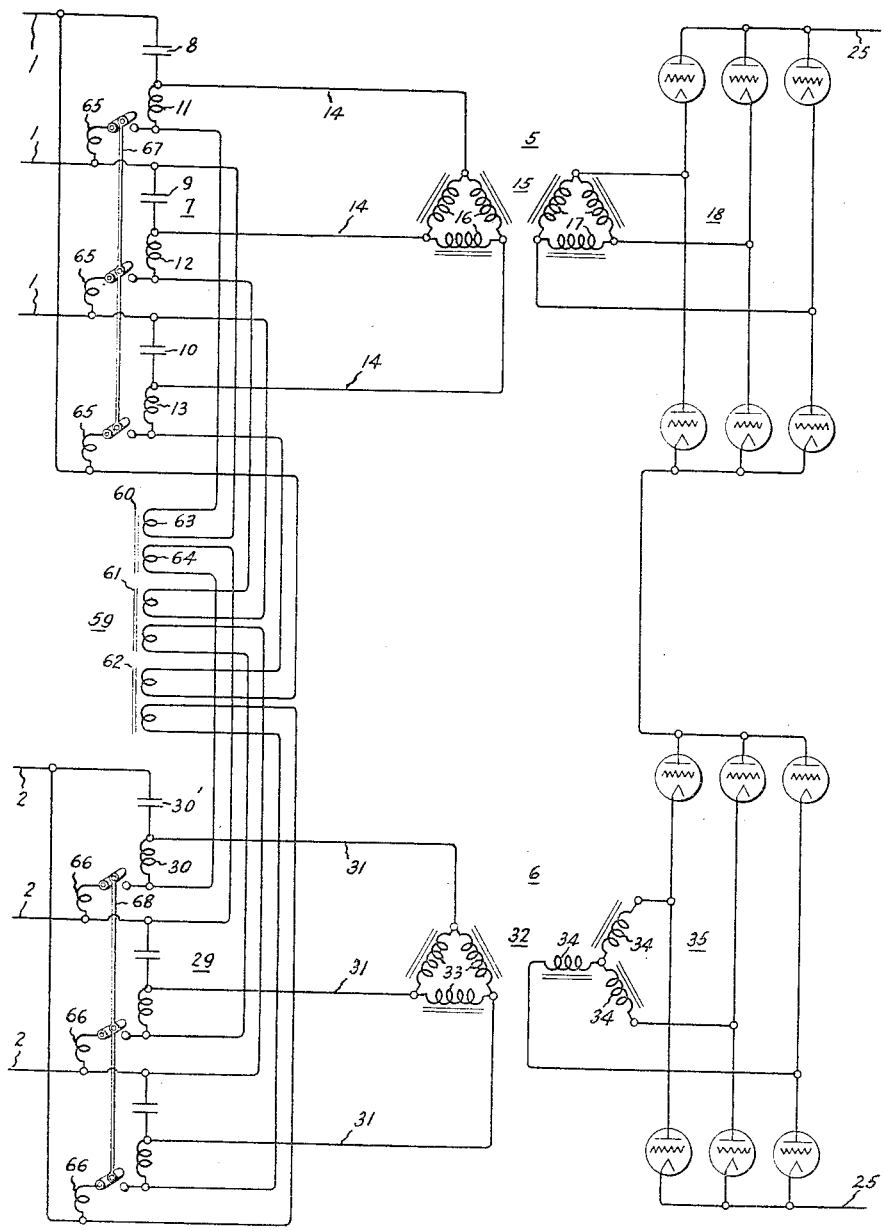

For a better understanding of my invention, reference may be had to the following description taken in connection with the accompanying drawings and its scope will be pointed out in the appended claims. Figs. 1 and 2 of the accompanying drawings diagrammatically illustrate embodiments of my invention as applied to electric valve power transmission systems for transmitting energy in the form of high voltage, constant current direct current.

Referring now to Fig. 1 of the accompanying drawings, I have illustrated my invention as applied to an electric valve power transmission system for transmitting electrical energy in the form of high voltage direct current of constant value. The system is shown as applied to an arrangement for transmitting power between constant voltage alternating current circuits 1, 2 and constant voltage alternating current circuits 3 and 4. While for the purposes of explaining my invention I have chosen to represent the various constant voltage circuits as being separate, it is to be understood that circuits 1 and 2 may be connected to a single constant voltage circuit and that circuits 3 and 4 may also be connected to a single constant voltage alternating current circuit. It is to be noted that the apparatus associated with circuits 1 and 2 and circuits 3 and 4 are similar in construction and arrangement and that there is effected by this arrangement a predetermined electrical symmetry. Considering first the apparatus associated with circuits 1 and 2, I employ a plurality of electric circuits 5 and 6 which are associated with the constant voltage circuits 1 and 2, respectively. Electric circuit 5 comprises a monocyclic network 7 including a plurality of branches of serially connected reactances of opposite sign, such as capacitances 8, 9 and 10 which are respectively connected in series relation with inductances 11, 12 and 13. A constant current, alternating current circuit 14 is connected to constant current terminals of the monocyclic network 7 and a transformer 15, having primary windings 16 and secondary windings 17, is connected to the constant current circuit 14 to obtain a predetermined voltage transformation of the constant current voltage of the monocyclic network 7. The transformer 15 through the connections of the secondary winding 17, is connected to an electric valve translating apparatus 18 including electric valves 19–24, inclusive, which effects the transfer of energy between the constant current alternating current circuit 14 and a high voltage, constant current, direct current transmission line 25. The electric valves 19–24 are preferably of the type employing an ionizable medium, such as a gas or a vapor, and each includes an anode 26, a cathode 27 and a control member 28. The electric valve apparatus 18 may operate either as a full wave rectifier or as an inverter, depending upon the direction of energy transfer over the system. In the event the energy transfer is from circuits 3 and 4 to circuits 1 and 2, the electric valve apparatus 18 operates as an inverter, in which case it is necessary that the control members 28 be energized to render the electric valves conductive periodically. Suitable excitation circuits may be employed for this purpose. I have found that I may employ an excitation circuit of the type disclosed and claimed in United States Letters Patent No. 1,935,464, granted November 14, 1933, upon an application of Clodius H. Willis and assigned to the assignee of the present application.

The electric circuit 6 associated with the constant voltage circuit 2 is substantially similar to electric circuit 5 and includes a monocyclic network 29, comprising inductances 30 and capacitances 30', a constant current alternating current circuit 31, a transformer 32 having primary windings 33 and secondary windings 34 and an electric valve translating apparatus 35. It will be noted, however, that the secondary windings 34 of transformer 32 are arranged in a Y connection, whereas secondary windings 17 of transformer 15 in electric circuit 5 are connected in delta. This arrangement effects a highly desired diminution in magnitude and phase displacement between the pulsations of current in the transmission line 25 and accordingly decreases the telephone interference factor. This feature is disclosed and claimed in my copending joint application Serial No. 97,012 previously referred to. As an agency for maintaining a predetermined division of load between the electric circuits 5 and 6 and hence to maintain a predetermined division of current between the constant current circuits 14 and 31, I provide a reactive network 36 including a plurality of inductive devices 37, 38 and 39. While the network 36 is shown as being of the inductive type, it is to be understood that I may employ a capacitive network if desired. Furthermore, the inductive devices 37–39 may be of the saturable type to limit the amount of balancing effect under fault conditions. The inductive devices 37–39 serve to control the resultant impedance of the monocyclic networks to maintain the desired division of load and current. Each of the inductive devices 37–39 is provided with a winding 40 which is associated with corresponding reactive elements of the monocyclic networks 7 and 29. The windings 40 are connected in circuit with corresponding inductances of the monocyclic networks 7 and 29 and maintain a predetermined division of load between circuits 5 and 6 by a current equalizing operation. Each of the inductive devices 37–39 is provided with a control winding 41 which controls the impedance of the associated windings 40 and hence controls the resultant or effective impedance of the associated inductances in the monocyclic networks 7 and 29. I provide a suitable arrangement 42 for controlling the energization of control windings 41 by controlling the magnetization of the inductive devices. The arrangement 42 may be any suitable device and for the purpose of illustration I have chosen to represent this controlling means as comprising a direct current generator 43 having an armature 44, a field winding 45 and a voltage controlling means such as a rheostat 46. The controlling means 42, of course, may be manually or automatically operated.

The electric circuits associated with the constant voltage alternating current circuits 3 and 4 are similar in construction and arrangement to the corresponding electric circuits 5 and 6. Electric circuits 47 and 48 are associated with the constant current direct current transmission line 25 and the constant voltage, alternating current circuits 3 and 4, respectively. The electric circuits 47 and 48 are provided with electric valve translating apparatus 49 and 50, transformers 51 and 52, constant current alternating current circuits 53 and 54, and monocyclic networks 55 and 56, respectively. An inductive network 57 is also associated with the monocyclic networks 55 and 56 and includes a plurality of inductive devices which are associated with corresponding inductances of the monocyclic networks. The corresponding elements of the inductive devices in network 57 are assigned reference numerals corresponding to like elements in the inductive network 36. A suitable controlling means 58, which is similar to the circuit controlling means 52, is associated with control windings 41 of the inductive devices 37–39 to control the impedances of the windings 40 and hence to control the resultant impedances of the monocyclic networks 55 and 56.

The general principles of operation of this type of system diagrammatically shown in Fig. 1 are described in detail in the above mentioned Stone patent. Briefly stated, the system will function to transfer energy between the constant voltage alternating current circuits 1 and 2 and the constant voltage circuits 3 and 4 over the constant current direct current transmission line 25, maintaining in the transmission line 25 a direct current of constant value. For the purposes of explanation, let it be assumed that energy is being transmitted from the constant voltage circuits 1 and 2 to the constant voltage circuits 3 and 4. Furthermore, let it be assumed that it is desired to maintain an equal distribution of load between electric circuits 5 and 6 and circuits 47 and 48. The inductive network 36 operates to maintain an equal distribution of load between electric circuits 5 and 6. In addition, the inductive network 36 may be controlled by the controlling means 42 to control the magnitudes of the constant currents which are transmitted to the constant current alternating current circuits 14 and 31 by the monocyclic networks 7 and 29.

The inductive devices 37–39 of the inductive network 36 perform the load balancing function by providing a current balancing path between corresponding inductances of the monocyclic networks 7 and 29. Furthermore, by controlling the impedances of the windings 40 of the inductances 37–39 by controlling the saturation of the devices 37–39 by means of the energization of the control windings 41, the resultant impedances of the monocyclic networks 7 and 29 may be adjusted to control the values of alternating currents which are maintained in circuits 14 and 31. For example, if it is desired to decrease the energy transfer between constant voltage circuits 1 and 2 and the transmission line 25, the resultant impedance of the inductive branches of the monocyclic networks 7 and 29 may be increased by effecting an increase in the impedance of windings 40 of the saturable inductive devices 37–39. This increase in impedance is effected by a reduction in the magnetization of the saturable inductive devices 37–39 from a saturated condition to a less saturated condition, or to a completely desaturated condition. The increase in impedance of the windings 40 of the inductive devices 37–39 increases the resultant impedance of the monocyclic networks 7 and 29 and decreases the value of constant current which is maintained in the constant current alternating current circuits 14 and 31. Conversely, if it is desired to increase the values of the currents maintained in circuits 14 and 31 and hence to increase the energy transfer in the system, the saturation of the inductive devices 37–39 is increased by increasing the energization of the control windings 41, effecting a decrease in the resultant impedance of the monocyclic networks 7 and 29 and permitting thereby the transfer of a greater amount of energy. The energization of control windings 41, of course, may be controlled by the adjustment of the rheostat 46 of the circuit controlling means 42 to obtain the desired value of current in circuits 14 and 31.

It is to be understood that the manipulation or operation of the circuit controlling means 42 must be accompanied by proper manipulation of the controlling means 58 associated with constant voltage circuits 3 and 4 in order to maintain a predetermined direction of energy transfer.

An important feature of my invention is the manner in which the system operates in the event one of the electric circuits 5 or 6 becomes defective when there is a great unbalance of one of the circuits. For example, if electric circuit 6 is subjected to a fault condition and if the inductive devices 37–39 are saturable, the electric circuit 5 will operate independently irrespective of the condition of circuit 6. In other words, the saturable characteristics of inductive devices 37–39 limit the balancing effect of the inductive network 36 and permits one of the circuits to operate independently in the event the other circuit is subjected to a severe fault condition.

Fig. 2 shows another embodiment of my invention as applied to a transmission system which is similar in many respects to the arrangement shown in Fig. 1, and like elements have been assigned corresponding reference numerals. An inductive network 59 is associated with the monocyclic networks 7 and 29 of electric circuits 5 and 6, respectively, to maintain a predetermined division of load among the electric circuits and comprises a plurality of inductive devices 60–62 each having inductively associated windings 63 and 64 which are connected in series relation with corresponding reactances of the monocyclic networks 7 and 29. For example, considering the inductive device 60, winding 63 is connected in series relation with inductance 11 of monocyclic network 7 and winding 64 is connected in series relation with inductance 30 of monocyclic network 29. As an agency for controlling the monocyclic networks and hence to control the balancing effect between circuits 5 and 6, I employ control impedance elements 65 and 66 which are associated with monocyclic networks 7 and 29, respectively. The control impedances 65 and 66 are arranged to be connected in shunt relation with inductive devices 60-62 by suitable circuit controlling means such as switches 67 and 68, respectively. When the switches 67 and 68 are in the closed circuit positions, the effective or resultant impedances of the monocyclic networks are, of course, decreased which effects a control of the currents which are maintained in the constant current alternating current circuits 14 and 31.

Although the control impedances 65 in Fig. 2 are illustrated as being inductances, it is to be understood that capacitive reactances or resistances may be employed if desired without departing from my invention in its broadest aspects. Furthermore, it is to be understood that the inductive devices 60-62 in the inductive network 59 may be of the saturable type and that I may employ suitable means for controlling the impedances of the windings 63 and 64 thereof. These control means may be either manual or automatic.

The operation of the embodiment of my invention shown in Fig. 2 is substantially the same as that shown in Fig. 1. If it be considered that energy is transmitted from the constant voltage alternating current circuits 1 and 2 to the direct current circuit 25, when the switches 67 and 68 are in the open positions the monocyclic networks 7 and 29 will maintain predetermined constant currents in circuits 14 and 31 and the network 59 will maintain a predetermined division of load between circuits 5 and 6. This balancing effect is accomplished by the inductive relationship between the windings 63 and 64 of the inductive devices 60-62. If it is desired to control the amount of balancing effect occasioned by the inductive network 59, the switches 67 and 68 may be moved to the closed circuit positions to shunt the network 59. Of course, under this condition the resultant impedances of the monocyclic networks 7 and 29 are also decreased which relation increases the magnitudes of the constant currents that are maintained in circuits 14 and 31 and hence causes an increase in the value of direct current which is maintained in circuit 25.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a plurality of constant voltage alternating current circuits, a constant current direct current circuit, a plurality of electric circuits each connected between a different one of said constant voltage alternating current circuits and said direct current circuit, each of said electric circuits comprising means for transforming constant voltage alternating current to alternating current of constant value, a constant current alternating current circuit and electric valve means connected between the constant current alternating current circuit and said direct current circuit for transmitting energy therebetween, and means for maintaining a predetermined division of load among said electric circuits.

2. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of reactances of opposite sign for transforming constant voltage alternating current to alternating current of constant value, a constant current alternating current circuit and electric valve means connected between the constant current alternating current circuit and the direct current circuit, and means common to the monocyclic networks for controlling the resultant impedances thereof to maintain a predetermined division of load among the various electric circuits.

3. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of reactances of opposite sign for transforming constant voltage alternating current to alternating current of constant value, a constant current alternating current circuit and electric valve means connected between the constant current alternating current circuit and the direct current circuit, and a network of reactive elements associated with the monocyclic networks for maintaining a predetermined relation among the currents in the respective constant current alternating current circuits.

4. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of reactances of opposite sign for transforming constant voltage alternating current to alternating current of constant value, a constant current alternating current circuit and electric valve means connected between the constant current alternating current circuit and the direct current circuit, a network of inductive elements associated with the constant current alternating current circuits to maintain a predetermined division of load current thereamong, and means for controlling the impedances of said inductive elements to control the magnitudes of the currents in the respective constant current alternating current circuits.

5. In combination, a plurality of constant voltage alternating current circuits, a constant current direct current circuit, a plurality of electric circuits each connected between a different one of said constant voltage alternating current circuits and said direct current circuit, each of said electric circuits comprising means for transforming constant voltage alternating current to alternating current of constant value, a constant current alternating current circuit and electric valve means connected between the constant current alternating current circuit and said direct current circuit for transmitting energy therebetween, means for maintaining a predetermined division of load among said electric circuits, and means for controlling the values of the currents in the various constant current alternating current circuits.

6. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of reactances of opposite sign for transforming constant voltage alternating current to alternating current of constant value, a constant current alternating current circuit and electric valve means connected between the constant current alternating current circuit and the direct current circuit, and means common to corresponding reactances of like sign in said monocyclic networks to control the resultant impedances thereof to maintain a predetermined division of load among the various electric circuits.

7. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of reactances of opposite sign for transforming constant voltage alternating current to alternating current of constant value, a constant current alternating current circuit and electric valve means connected between the constant current alternating current circuit and the direct current circuit, means common to corresponding reactances of like sign in said monocyclic networks to control the resultant impedances thereof for maintaining a predetermined division of load among the various electric circuits, and means for controlling said last mentioned means to control the currents which are maintained in the respective constant current alternating current circuits.

8. In combination, a plurality of constant voltage alternating current circuits, a direct current circuit, a plurality of electric circuits each connected between a different one of said constant voltage circuits and said direct current circuit for transmitting energy therebetween, each of said electric circuits comprising a monocyclic network including a plurality of branches of serially connected capacitances and inductances for transforming constant voltage alternating current to alternating current of constant value, a constant current alternating current circuit and electric valve means connected between the constant current alternating current circuit and the direct current circuit, and means comprising a plurality of control inductive reactances associated with corresponding inductances of said monocyclic networks to control the division of load among said electric circuits.

9. In combination, a plurality of constant voltage alternating current circuits, a direct current circuit, a plurality of electric circuits each connected between a different one of said constant voltage circuits and said direct current circuit for transmitting energy therebetween, each of said electric circuits comprising a monocyclic network including a plurality of branches of serially connected capacitances and inductances for transforming constant voltage alternating current to alternating current of constant value, a constant current alternating current circuit and electric valve means connected between the constant current alternating current circuit and the direct current circuit, means comprising a saturable inductive reactance including a plurality of windings each common to corresponding inductances of said monocyclic networks and a plurality of control windings therefor, and means for supplying direct current to said control windings to control the currents which are transmitted to the various constant current alternating current circuits by the respective monocyclic networks.

10. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of serially connected inductances and capacitances for transforming constant voltage alternating current to alternating current of constant value, a constant current alternating current circuit and electric valve means connected between the constant current alternating current circuit and the direct current circuit, and a plurality of inductive windings each connected in circuit with corresponding inductances of said monocyclic networks to maintain a predetermined division of load among said electric circuits.

11. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of serially connected inductances and capacitances for transforming constant voltage alternating current to alternating current of constant value, a constant current alternating current circuit and electric valve means connected between the constant current alternating current circuit and the direct current circuit, and a plurality of inductive devices each having a winding connected in circuit with corresponding inductances of said monocyclic networks to maintain a predetermined division of load among said electric circuits and having associated control windings for controlling the magnitudes of the currents in the respective constant current alternating current circuits.

12. In combination, a plurality of constant voltage alternating current circuits, a constant current direct current circuit, a plurality of electric circuits each connected between a different one of said constant voltage circuits and said direct current circuit for transmitting energy therebetween, each of said electric circuits comprising a monocyclic network including a plurality of branches of serially connected inductances and capacitances for transforming constant voltage alternating current to alternating current of constant value, a constant current alternating current circuit and electric valve means connected between the constant current alternating current circuit and the direct current circuit, a plurality of inductive devices each having a winding connected in circuit with corresponding inductances of said monocyclic networks to maintain a predetermined division of load among said electric circuits and having an inductively associated control winding for controlling the magnitudes of the currents in the respective constant current alternating current circuits, and means for controlling said control windings.

13. In combination, a plurality of constant voltage alternating current circuits, a constant current direct current circuit, a plurality of electric circuits each connected between a different one of said constant voltage alternating current circuits and said direct current circuit, each of said electric circuits comprising means for transforming constant voltage alternating current to alternating current of constant value, a constant current alternating current circuit and electric valve means connected between the constant current alternating current circuit and said direct current circuit for transmitting energy therebetween, and means comprising a saturable inductive reactance for controlling the division of load among said electric circuits.

14. In combination, a plurality of constant voltage alternating current circuits, a constant current direct current circuit, a plurality of electric circuits each connected between a different one of said constant voltage circuits and said direct current circuit for transmitting energy therebetween and each comprising a monocyclic network including a plurality of branches of serially connected inductances and capacitances for transforming constant voltage alternating current to alternating current of constant value, a constant current alternating current circuit and elecric valve means connected between the constant current alternating current circuit and the direct current circuit, and an inductive network comprising a plurality of inductive devices each having inductively associated windings connected in series relation with inductances of the respective monocyclic networks to maintain a predetermined division of load among the respective electric circuits.

15. In combination, a plurality of constant voltage alternating current circuits, a constant current direct current circuit, a plurality of electric circuits each connected between a different one of said constant voltage circuits and said direct current circuit for transmitting energy therebetween and each comprising a monocyclic network including a plurality of branches of serially connected inductances and capacitances for transforming constant voltage alternating current to alternating current of constant value, a constant current alternating current circuit and electric valve means connected between the constant current alternating current circuit and the direct current circuit, an inductive network comprising a plurality of inductive devices each having inductively associated windings connected in series relation with inductances of the respective monocyclic networks to maintain a predetermined division of load among the respective electric circuits, and means comprising impedance elements arranged to shunt the windings of said inductive devices to control said monocyclic networks.

16. In an electric power transmission system of the constant current direct current type for transmitting energy between constant voltage alternating current circuits, the combination of a plurality of electric circuits associated with the constant voltage alternating current circuits, a constant current direct current transmission circuit, each of said electric circuits comprising means for transforming constant voltage alternating current to alternating current of constant value, a constant current alternating current circuit and electric valve means connected between the constant current alternating current circuit and the transmission circuit, and means for maintaining a predetermined division of load among the various electric circuits.

17. In combination, a plurality of constant voltage alternating current circuits, a plurality of constant current alternating current circuits, means interconnected between each pair of constant voltage-constant current circuits for transforming constant voltage alternating current to alternating current of constant value, and means interconnecting said first mentioned means for maintaining a predetermined division of load among said electric circuits.

18. In combination, a plurality of constant voltage alternating current circuits, a plurality of constant current alternating current circuits, means interconnected between each pair of constant voltage-constant current circuits comprising a monocyclic network for transforming constant voltage alternating current to alternating current of constant value, and means for inductively coupling corresponding elements of the various monocyclic networks for maintaining a predetermined division of load among the various constant current circuits.

19. In combination, a plurality of constant voltage alternating current circuits, a plurality of constant current alternating current circuits, means interconnected between each pair of constant voltage-constant current circuits for transforming constant voltage alternating current to alternating current of constant value, and means connected to the transforming means for maintaining a predetermined division of load among the various constant current alternating current circuits and for controlling magnitudes of the currents therein.

20. In combination, a plurality of constant voltage alternating current circuits, a plurality of constant current alternating current circuits, means interconnected between each pair of constant voltage-constant current circuits comprising a monocyclic network for transforming constant voltage alternating current to alternating current of constant value, and means associated with the monocyclic networks for controlling the division of load among said circuits and for controlling the magnitudes of the currents therein.

BURNICE D. BEDFORD.